United States Patent [19]

King et al.

[11] 4,234,839
[45] Nov. 18, 1980

[54] BATTERY CHARGING

[75] Inventors: Christopher D. King, 12 Parkers Rd., Parkdale, Victoria; Noel T. Bowman, 11 Mountain Hwy., Frankston, Victoria, both of Australia

[73] Assignees: Christopher Duff King; Sally King, both of Parkdale; Noel Trevor Bowman, Frankston, all of Australia

[21] Appl. No.: 956,823

[22] Filed: Nov. 1, 1978

[30] Foreign Application Priority Data

Nov. 8, 1977 [AU] Australia ............................ 2344/77

[51] Int. Cl.³ .................... H02J 7/04; H01M 10/46
[52] U.S. Cl. ............................................. 320/36; 320/2
[58] Field of Search ............................ 320/35, 36, 2

[56] References Cited

U.S. PATENT DOCUMENTS

| | | | |
|---|---|---|---|
| 2,550,344 | 4/1951 | Godshalk | 320/36 |
| 3,601,679 | 8/1971 | Braun et al. | 320/35 |
| 3,609,505 | 9/1971 | Harland, Jr. et al. | 320/35 |
| 4,100,475 | 7/1978 | Gansert et al. | 320/35 |

*Primary Examiner*—Robert J. Hickey
*Attorney, Agent, or Firm*—Schwartz, Jeffery, Schwaab, Mack, Blumenthal & Koch

[57] ABSTRACT

A battery charging system is disclosed wherein there is control means connected with a battery charger responsive to the temperature of a temperature sensor connected with a battery to sense its temperature whereby to switch off the charging when the battery temperature is at or above a predetermined temperature unsuitable for charging. The control means includes a signal transmitter and a signal receiver. The signal transmitter applies a pulsed signal to the charging leads when the temperature of the battery is at or above the predetermined temperature and the receiver detects this and switches off the charging. A signal transmitter and temperature sensor, and a battery fitted therewith is also disclosed.

5 Claims, 5 Drawing Figures

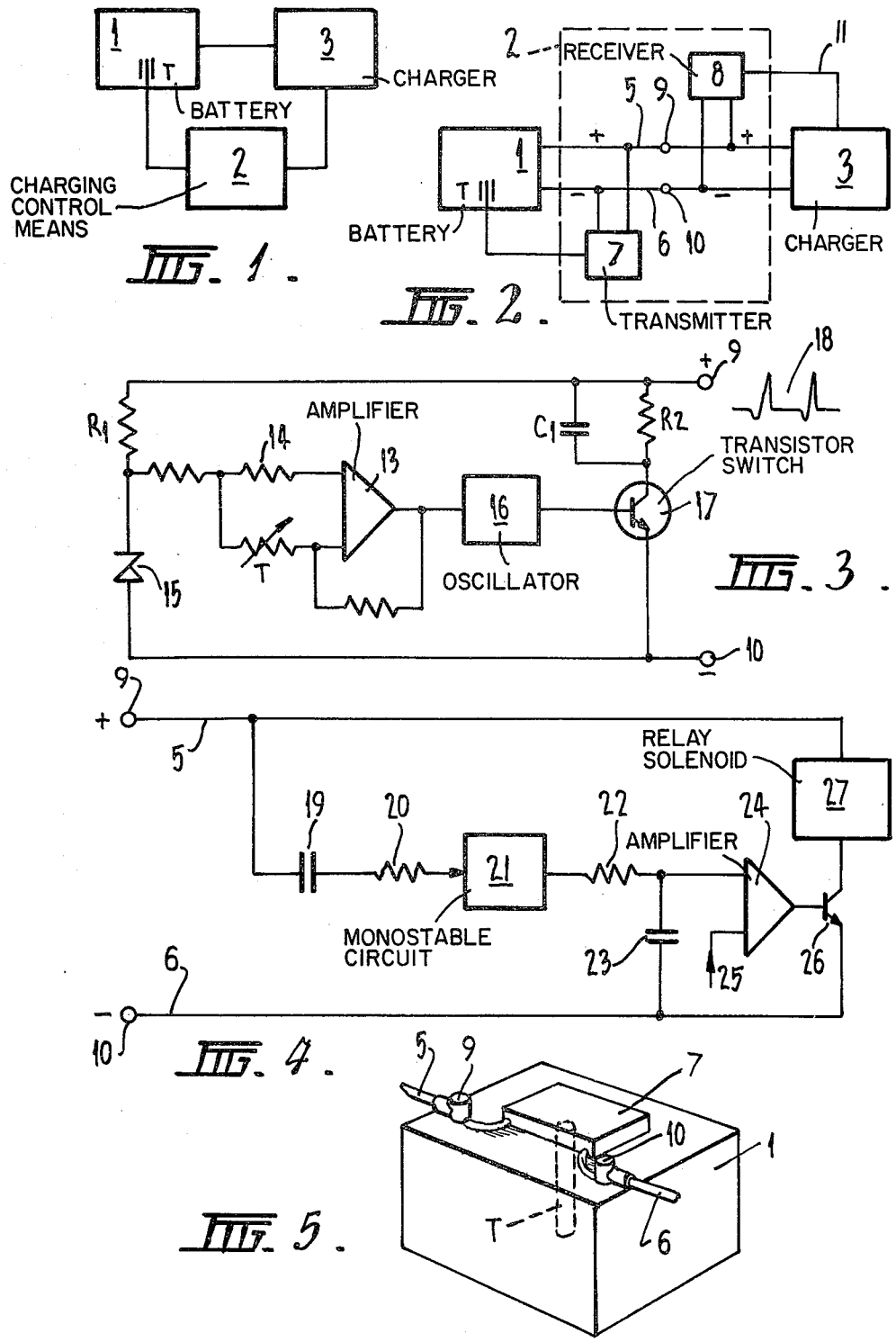

BATTERY CHARGING

BACKGROUND OF THE INVENTION

1. Field of the Invention

This invention relates to battery charging and relates particularly but not exclusively to battery charging in respect of batteries such as used for industrial applications as in fork lift trucks and the like battery operated vehicles.

2. Description of Prior Art

In the industrial usage of batteries, particularly where high energy drainage is required, it has been a problem that the batteries are sometimes destroyed during the charging process. We believe the destruction has been consequent on charging when the battery temperature exceeds a safe charging temperature and not on the previously held theory of too high a charging current. Tests conducted by us have established that this is so. The temperature of the battery can be exceeded not only by charging at too high a current but also by a rapid discharge preceding the charging.

BRIEF SUMMARY OF THE INVENTION

An object of the present invention is to provide a battery charging control system responsive to prevent charging when the battery temperature exceeds a predetermined amount.

In accordance with the present invention there is provided a battery charging system comprising a charging circuit, battery temperature sensing means and charging circuit control means operatively connected with the battery temperature sensing means to stop charging when the temperature sensing means senses that the temperature of a battery being charged is at or above a predetermined temperature unsuitable for charging.

Sensibly the charging circuit control means should, but not essentially, be operable to connect with the battery via only the normal two leads which are used for supplying charging current to the battery. A particular preferred embodiment of the present invention provides this feature.

According to a further aspect of the present invention there is provided a signal transmitter and temperature sensor for connection to a battery terminal to provide a pulsed signal at the battery terminals when the temperature of the battery is at or above a predetermined temperature unsuitable for charging, said temperature sensor being connectable to said battery to measure the temperature thereof, and said signal transmitter comprises means connected to said temperature sensor to obtain a voltage thereacross which varies in accordance with the temperature of said battery voltage comparator means for comparing the voltage thereacross with a predetermined reference voltage and for providing an output signal if the voltage thereacross is greater than said predetermined reference voltage representative of the battery temperature being at or above said predetermined temperature, an oscillator connected to said voltage comparator to receive said output signal and to cause it to oscillate in response to receipt of said output signal, and a transistor switch arranged to short the battery through a parallel connected resistor and condenser at the frequency of oscillation of said oscillator, whereby to apply said pulsed signal to said battery terminals.

According to a further aspect of the present invention there is provided a signal receiver for connection to a battery charger to switch off the charger on receipt of a signal at the battery charger leads, said signal indicating that the temperature of the battery is at or above a predetermined temperature unsuitable for charging, said receiver comprising circuit means for detecting the presence of said signal and for closing a relay whereby to disconnect charging current from charging leads extending from said battery charger.

According to a further aspect of the present invention there is also provided a battery fitted with a signal transmitter of the above type and a temperature sensor integrally connected.

Most preferably the temperature sensing means is a temperature dependent resistance inserted in the battery.

It is also preferred that the charging circuit control means includes a transmitter powered from the battery or from the charger and that an AC signal is generated thereby and used to indicate to a receiver that the resistance of the temperature sensing means has reached or is above the predetermined temperature. In this connection the receiver acts to switch off the charger when an AC signal is received thereby.

BRIEF DESCRIPTION OF THE DRAWINGS

In order that the invention can be more clearly ascertained preferred embodiments will now be described with reference to the accompanying drawings wherein:

FIG. 1 is a basic block schematic diagram of a charging system in accordance with the present invention;

FIG. 2 is a basic schematic block diagram of a particularly preferred embodiment of the present invention;

FIG. 3 is a detailed circuit diagram of a signal transmitter for use in the circuit of FIG. 2;

FIG. 4 is a detailed circuit diagram of a receiver for use in the circuit of FIG. 2, and FIG. 5 is a perspective view diagrammatically showing a battery with a temperature sensor and transmitter permanently fitted thereto.

DESCRIPTION OF PREFERRED EMBODIMENTS

Referring firstly to FIG. 1 there is disclosed a very simple charging unit system according to the present invention. As can be seen there is a temperature sensing device T inserted in the battery 1. The temperature sensing device T can be inserted in the core of the battery 1 as in the casing material thereof or alternatively it can be fitted so as to extend into the electrolyte within the battery itself. The temperature sensing device T is preferably a temperature dependent resistor. Such device is connected with charging control means 2 whereby when the temperature of the battery 1 changes the resistance of the device changes and should the resistance change to a value which the control means 2 recognises by a temperature which is higher than a predetermined temperature, then the charger 3 is switched off. The charging control means 2 may be a transistor switch circuit connected in the charger 3 output lines.

Referring now to FIG. 2 there is shown a particularly preferred embodiment wherein only two leads 5 and 6 need connect the charger 3 and the control unit 2 to the terminals of the battery 1.

In this embodiment the leads 5 and 6 may be the normal battery charging leads. The charging circuit includes a transmitter device 7 permanently wired to the battery terminals and a receiver device 8 permanently wired to the charger 1. Power for the receiver 8 can be obtained either from the battery 1 or from the charger 3 or alternatively from a separate power source. It can be seen by inspecting FIG. 2 and FIG. 5 that the battery 1, transmitter 7 and receiver 8 and charger 3 are all connected together at the battery terminals 9 and 10. By inspecting FIG. 4 it can be seen that the receiver 8 is operatively connected with the charger 3 to switch on or off the charger 3, via lead 11.

The circuit of FIG. 3 will now be described in detail. The temperature sensing device T, is a temperature dependent resistor, which is inserted into the battery 1 so as to extend into the electrolyte. The temperature dependent resistor T is operatively connected with a differential amplifier 13. A reference resistor 14 is operatively connected with the differential amplifier 13 and the value of the reference resistance 14 is chosen to be equal, in ohms, to that of the temperature dependent resistor T at the temperature where the charger 3 is to switch off. It can be seen that the temperature dependent resistor T and the reference resistor 14 are connected with a zenner diode 15 and resistance R1 whereby to have a substantially stabilised voltage from the battery rails applied thereto. The function of the differential amplifier 13 is to provide an output (on/off) signal when the potential at the terminal of the differential amplifier 13 connected to the reference resistor 14 is higher than that at the terminal of the temperature dependent resistor T. The output of the differential amplifier is then applied to an oscillator 16 (free running at 20 K Hertz) to switch the oscillator 16 on when the differential amplifier 13 provides a high output. This condition indicates that the temperature of the battery 1 is too high and charging should be stopped.

The output of the oscillator 16 is, in turn, fed to a transistor switch 17 which operates to momentarily short the battery rails for each positive going cycle of the oscillator 16. The rails are shorted through resistance R2 during this procedure and the consequent voltage developed across R2 is applied to condenser C1 which charges and, in turn, applies a spiked AC pulse 18 of approximately 1 μsec. duration to the rails. The frequency of the pulses 18 are the same as that of the oscillator —20 K hertz.

The circuit of the receiver 8 will now be described. It will be appreciated that the receiver 8 is designed to see the AC pulse 18 provided by the transmitter 7 described above. Should pulse 18 be present then the receiver 8 acts to switch off the charger 3. From the leads 5 and 6 the AC pulse 8 passes through a high pass filter comprising condenser 19 and resistor 20 which is tuned to pass such signals and any higher frequency signals.

The pulses 18 are then fed into a monostable circuit 21 and stretched to a length of approximately 35 μsec. to provide for a rise time of the pulse over a period sufficient to be easily detected by later circuitry. The stretched pulses are then fed into a low pass filter composed of resistor 22 and condenser 23 to average the voltage of the pulse train. The voltage generated on capacitor 23 is in turn compared in a differential amplifier 24 against a reference voltage of approximately 6 V DC supplied to lead 25. The reference voltage supplied to lead 25 can be obtained from the rails 5 and 6 by a resistor and suitable zenner diode (not shown). When the differential amplifier 21 operates by indicating there is greater potential at condenser 23 than the reference voltage, then transistor switch 26 switches on and pulls in a relay solenoid 27 which in turn interrupts the charging current to the battery. The reference voltage is arbitrarily chosen as 6 volts which is sufficiently high as not to cause operation if there is spurious electrical interference on the charging leads 5 and 6.

The charger 3 can be any standard battery charger known in the art of charging rechargable cells.

We have found by experimentation that the predetermined temperature should be approximately 52° C. for wet cell lead acid batteries used for traction purposes. The charging current is then maintained at known safe current levels.

In use the batteries are disconnected from any load and connected with the charger 1 via leads 5 and 6. If the battery 1 is above the predetermined temperature the control means 2 will switch the charger 1 off. Thus the battery would cool down below the predetermined temperature by natural cooling processes before being charged. If the battery was charged at too high a rate causing the temperature to increase above the predetermined temperature then the charging would be stopped until the temperature fell to a satisfactory level.

It will be appreciated that the AC signal pulse 18 may be arranged such that it is always present except when the battery 1 has reached the predetermined temperature and thus by appropriate rearrangement of the receiver 8 the charger 3 can be arranged to switch off when this signal is absent.

From the above it will be appreciated that connection to charge the battery 1 may be made by only the normal two leads 5 and 6 which supply the charging current. Thus, with the preferred system, it obviates the need for many wires connected to the battery terminals and to a temperature dependent resistor.

It will also be appreciated that by suitable circuit modification the internal resistance of the battery 1 may be measured, as distinct from measuring the resistance of a temperature sensing means T connected to the battery 1, and that when this reaches a value indicating that the battery 1 has reached or exceeded the predetermined safe temperature for charging then the charger 3 can be switched off thereby.

We claim:

1. A battery charging system comprising a charging circuit, battery temperature sensing means and charging circuit control means operatively connected with the battery temperature sensing means to stop charging when the temperature sensing means senses that the temperature of a battery being charged is at or above a predetermined temperature unsuitable for charging, and wherein the charging circuit control means includes a signal transmitter and a signal receiver and wherein the transmitter generates and transmits a signal when the temperature of the temperature sensing means is above a predetermined value and the receiver detects such signal and switches off the charging circuit and wherein during charging the signal transmitter and the signal receiver are continuously powered by DC which is on charging leads connected between said charging circuit and said battery, said signal transmitter being connected to the battery terminals and said temperature sensing means being connected to the battery so that when the charging leads are removed the signal transmitter and the temperature sensing means remain connected to the battery terminals as a unitary structure.

2. A battery charging system comprising a charging circuit, battery temperature sensing means and charging circuit control means operatively connected with the battery temperature sensing means to stop charging when the temperature sensing means senses that the temperature of a battery being charged is at or above a predetermined temperature unsuitable for charging and wherein the charging circuit control means includes a signal transmitter and a signal receiver and wherein the transmitter generates and transmits a signal when the temperature of the temperature sensing means is above a predetermined value and the receiver detects such signal and switches off the charging circuit and wherein during charging the signal transmitter and the signal receiver are continuously powered by DC which is on charging leads connected between said charging circuit and said battery and wherein the signal transmitter is connected to the battery terminals and the temperature sensing means is connected to the battery so that when the charging leads are removed the signal transmitter and the temperature sensing means remain connected to the battery terminals as a unitary structure and wherein the signal transmitter is arranged to apply a pulsed signal onto the charging leads when the temperature of the battery is at or above the predetermined temperature, and wherein the signal receiver is arranged to detect the presence of the pulsed signal on the charging leads and to switch off the charging current to the battery on such detection.

3. A battery charging system as claimed in claim 2 wherein the temperature sensing means is a temperature dependent resistance wired so that as the resistance changes the potential thereacross changes and wherein the signal transmitter has a voltage comparator means which receives the voltage across said temperature dependent resistance and compares it against a predetermined reference voltage so that when there is a difference representative of the temperature being at or above the predetermined temperature, the voltage comparator provides an output signal to an oscillator to cause it to oscillate to in turn switch on a transistor switch at a rate equal to the oscillation frequency of the oscillator whereby to short the charging leads through a resistor and a parallel connected condenser at the oscillator frequency to provide said pulsed signal.

4. A battery charging system comprising a charging circuit, battery temperature sensing means and charging circuit control means operatively connected with the battery temperature sensing means to stop charging when the temperature sensing means senses that the temperature of a battery being charged is at or above a predetermined temperature unsuitable for charging and wherein the charging circuit control means includes a signal transmitter and a signal receiver and wherein the transmitter generates and transmits a signal when the temperature of the temperature sensing means is above a predetermined value and the receiver detects such signal and switches off the charging circuit and wherein during charging the signal transmitter and the signal receiver are continuously powered by DC which is on charging leads connected between said charging circuit and said battery and wherein the signal transmitter is connected to the battery terminals and the temperature sensing means is connected to the battery so that when the charging leads are removed the signal transmitter and the temperature sensing means remain connected to the battery terminals as a unitary structure and wherein the signal transmitter is arranged to apply a pulsed signal onto the charging leads when the temperature of the battery is at or above the predetermined temperature, and wherein the signal receiver is arranged to detect the presence of the pulses signal on the charging leads and to switch off the charging current to the battery on such detection and wherein the temperature sensing means is a temperature dependent resistance wired so that as the resistance changes the potential thereacross changes and wherein the signal transmitter has a voltage comparator means which receives the voltage across said temperature dependent resistance and compares it against a predetermined reference voltage so that when there is a difference representative of the temperature being at or above the predetermined temperature, the voltage comparator provides an output signal to an oscillator to cause it to oscillate to in turn switch on a transistor switch at a rate equal to the oscillation frequency of the oscillator whereby to short the charging leads through a resistor and a parallel connected condenser at the oscillator frequency to provide said pulsed signal and wherein said signal receiver has a high-pass filter for passing said pulsed signal, a monostable circuit for receiving said pulsed signal from said high pass filter and for stretching the duration of the pulses, a low-pass filter for receiving the stretched pulses and for averaging the voltage of the pulses, a voltage comparator connected to receive said averaged voltage and arranged to compare said averaged voltage with a reference voltage and to provide a signal output when the averaged voltage is greater than said reference voltage, a transistor switch connected to receive said signal output and to apply a current to a relay to operate said relay to disconnect the charging current from said charging leads.

5. A signal transmitter and temperature sensor for connection to a battery terminals to provide a pulsed signal at the battery terminals when the temperature of the battery is at or above a predetermined temperature unsuitable for charging, said temperature sensor being connectable to said battery to measure the temperature thereof, and said signal transmitter comprises means connected to said temperature sensor to obtain a voltage thereacross which varies in accordance with the temperature of said battery voltage comparator means for comparing the voltage thereacross with a predetermined reference voltage and for providing an output signal if the voltage thereacross is greater than said predetermined reference voltage representative of the battery temperature being at or above said predetermined temperature, an oscillator connected to said voltage comparator to receive said output signal and to cause it to oscillate in response to receipt of said output signal, and a transistor switch arranged to short the battery through a parallel connected resistor and condenser at the frequency of oscillation of said oscillator, whereby to apply said pulsed signal to said battery terminals.

* * * * *